United States Patent
Yamamoto et al.

(10) Patent No.: US 11,125,559 B2
(45) Date of Patent: Sep. 21, 2021

(54) BALL ROTATION AMOUNT MEASUREMENT SYSTEM

(71) Applicant: AICHI STEEL CORPORATION, Tokai (JP)

(72) Inventors: Michiharu Yamamoto, Aichi (JP); Kazuo Urakawa, Aichi (JP); Masaki Mori, Aichi (JP)

(73) Assignee: AICHI STEEL CORPORATION, Tokai (JP)

( * ) Notice: Subject to any disclaimer, the term of this patent is extended or adjusted under 35 U.S.C. 154(b) by 76 days.

(21) Appl. No.: 16/496,003

(22) PCT Filed: Feb. 23, 2018

(86) PCT No.: PCT/JP2018/006738
§ 371 (c)(1),
(2) Date: Sep. 20, 2019

(87) PCT Pub. No.: WO2018/180076
PCT Pub. Date: Oct. 4, 2018

(65) Prior Publication Data
US 2020/0103230 A1   Apr. 2, 2020

(30) Foreign Application Priority Data

Mar. 30, 2017  (JP) .............................. JP2017-066668
Nov. 6, 2017   (JP) .............................. JP2017-213892

(51) Int. Cl.
*G01C 17/02* (2006.01)
*G01P 15/18* (2013.01)

(52) U.S. Cl.
CPC .............. *G01C 17/02* (2013.01); *G01P 15/18* (2013.01)

(58) Field of Classification Search
CPC .......... G01C 17/02; G01P 15/18; G06F 51/00
See application file for complete search history.

(56) References Cited

U.S. PATENT DOCUMENTS 3,899,928 A   8/1975  Fraiture
6,042,483 A * 3/2000  Katayama .......... A63B 24/0003
                                           473/199
(Continued)

FOREIGN PATENT DOCUMENTS

CN   102221369 A   10/2011
JP   49-128500 A   12/1974
(Continued)

OTHER PUBLICATIONS

Korean Office Action dated Oct. 5, 2020 in Patent Application No. 10-2019-7026022 (with English translation), 15 pages.
(Continued)

*Primary Examiner* — Elias Desta
(74) *Attorney, Agent, or Firm* — Oblon, McClelland, Maier & Neustadt, L.L.P.

(57) ABSTRACT

A ball rotation amount measurement system which includes a magnetic sensor fixed to a ball to measure geomagnetism in at least one axis direction, and a computation unit configured to compute the rotation amount of the ball using data of a large number of the geomagnetism time-sequentially acquired by the magnetic sensor. The computation unit includes a difference data calculation unit configured to calculate a difference between two of the time-sequential geomagnetic data to thereby time-sequentially obtain a large number of difference data, a difference waveform calculation unit configured to determine a difference waveform that represents a time variation waveform of a large number of the difference data, and a rotation amount calculation unit configured to calculate the rotation amount of the ball, based on information of zero cross points at which the difference waveform crosses a straight line indicating zero-difference within a predetermined period.

13 Claims, 9 Drawing Sheets

(56) References Cited

U.S. PATENT DOCUMENTS

| | | | |
|---|---|---|---|
| 7,578,165 B1* | 8/2009 | Stupecky | G01B 11/002 356/627 |
| 8,781,610 B2 | 7/2014 | Han | |
| 10,184,992 B2 | 1/2019 | Urakawa et al. | |
| 2005/0093539 A1 | 5/2005 | Salfelner | |
| 2006/0012790 A1* | 1/2006 | Furze | G01N 21/951 356/402 |
| 2009/0075744 A1* | 3/2009 | Tuxen | A63B 24/0021 473/200 |
| 2012/0277890 A1 | 11/2012 | Han | |
| 2014/0043153 A1 | 2/2014 | Lim | |
| 2014/0349267 A1 | 11/2014 | Thornton | |
| 2016/0001136 A1 | 1/2016 | King et al. | |
| 2017/0023602 A1 | 1/2017 | Urakawa et al. | |
| 2018/0162183 A1 | 6/2018 | Park et al. | |

FOREIGN PATENT DOCUMENTS

| | | |
|---|---|---|
| JP | 55-154410 A | 12/1980 |
| JP | 2011-252857 A | 12/2011 |
| JP | 2012-112704 A | 6/2012 |
| JP | 2014-514946 A | 6/2014 |
| JP | 2014-160025 A | 9/2014 |
| JP | 2017-26427 A | 2/2017 |
| TW | 593981 | 6/2004 |

OTHER PUBLICATIONS

U.S. Appl. No. 15/342,409, filed Nov. 3, 2016, US 2017/0261644 A1, Michiharu Yamamoto.

Extended European Search Report dated Feb. 11, 2020, in Patent Application No. 18777805.5, 8 pages.

Translation of the International Preliminary Report on Patentability and Written Opinion dated Oct. 10, 2019, in PCT/JP2018/006738, 6 pages.

International Search Report dated May 15, 2018 in PCT/JP2018/006738 filed on Feb. 23, 2018.

Office Action dated Feb. 20, 2021, in Taiwanese Patent Application No. 107108426 w/English Machine Translation.

Article 94(3) EPC Communication dated Mar. 22, 2021, in European Patent Application No. 18 777 805.5.

* cited by examiner

BALL ROTATION AMOUNT MEASUREMENT SYSTEM

CROSS-REFERENCE TO RELATED APPLICATIONS

This application is a United States national stage application of International Application No. PCT/JP2018/006738 filed Feb. 23, 2018, which designates the United States, and claims priority to Japanese Patent Application No. 2017-066668 filed Mar. 30, 2017, and Japanese Patent Application No. 2017-213892, filed Nov. 6, 2017, and the entire contents of each of the above applications are hereby incorporated herein by reference in entirety.

TECHNICAL FIELD

The present invention relates to a ball rotation amount measurement system for measuring the rotation amount of a ball moving in midair.

BACKGROUND ART

As a rotation speed measurement device for measuring the rotation speed of a ball moving in midair, a device using a magnetic sensor that measures geomagnetism is disclosed in Patent Document 1. In this rotation speed measurement device, the magnetic sensor is fixed to a ball, and the frequency in detected data of the magnetic sensor is analyzed by FFT (fast Fourier transform), etc., so that the rotation speed of the ball moving in the art is calculated.

PRIOR ART LITERATURE

Patent Document

Patent Document 1: JP-A-2014-160025

SUMMARY OF THE INVENTION

Problem to be Solved by the Invention

However, a method for calculating a rotation speed in Patent Document 1, that is, a calculation method involving analysis of the frequency of the magnetic sensor has the following problems.

Balls for various sports such as baseball and golf are targeted for measurement by the aforementioned rotation speed calculation method. For example, in the case of baseball, the speed of a ball may be higher than 150 km/hr. In this case, a period of time taken for the ball to reach a catcher after being released from a hand of a pitcher is as extremely short as less than 0.5 seconds. In such a case, even when geomagnetic data for measurement of the rotation speed is acquired at a time interval as extremely short as approximately 2 milliseconds, the number of data to be acquired is only 200 or so.

Patent Document 1 discloses a technology concerning a method for calculating a rotation speed by frequency analysis using FFT analysis. However, in case FFT analysis is performed on the aforementioned number of data, there is a problem in that high accuracy cannot be expected because of its low resolution. In particular, some pitchers may achieve very high rotation speed, and thus poor accuracy becomes remarkably influential.

In the first place, frequency analysis such as FFT has a problem of causing large consumption of RAM.

In addition, in order to solve the aforementioned problems, it may conceivable to conduct a method of counting a frequency by counting the number of times of crossing with a straight line indicating the output from the magnetic sensor is zero. However, due to an influence of the magnetic field around the magnetic sensor, etc., geomagnetic data to be measured may be offset. That is, even when no geomagnetism actually acts in the sensing direction, the output from the magnetic sensor may be deviated from zero. In this case, unless an offset amount which is the amount of the deviation is sufficiently smaller than its amplitude, it is difficult to calculate the frequency of the sine wave by counting zero cross points at which the sine wave crosses a straight line indicating zero-output.

The present invention has been made in view of the above background, and provides a ball rotation amount measurement system that is capable of measuring the rotation amount of a ball with high accuracy.

Means for Solving the Problem

One aspect of the present invention is a ball rotation amount measurement system for measuring a rotation amount of a ball moving in midair, the system including:
a magnetic sensor fixed to the ball to measure geomagnetism in at least one axial direction; and
a computation unit configured to compute the rotation amount of the ball by using data of a large number of the geomagnetism time-sequentially acquired by the magnetic sensor, wherein
the computation unit includes: a difference data calculation unit configured to calculate a difference between two of the time-sequential geomagnetic data to thereby time-sequentially obtain a large number of difference data;
a difference waveform calculation unit configured to determine a difference waveform that represents a time variation waveform of a large number of the difference data; and
a rotation amount calculation unit configured to calculate the rotation amount of the ball, based on information of zero cross points at which the difference waveform crosses a straight line indicating zero-difference.

Effects of the Invention

In the ball rotation amount measurement system, the computation unit includes the difference data calculation unit, the difference waveform calculation unit, and the rotation amount calculation unit. Accordingly, even when the ball is rotating at high speed, the rotation amount of the ball can be calculated with accuracy, as described later.

As described above, the aforementioned aspect can provide a ball rotation amount measurement system capable of measuring the rotation amount of a ball with high accuracy.

MODE FOR CARRYING OUT THE INVENTION

Figure 1:
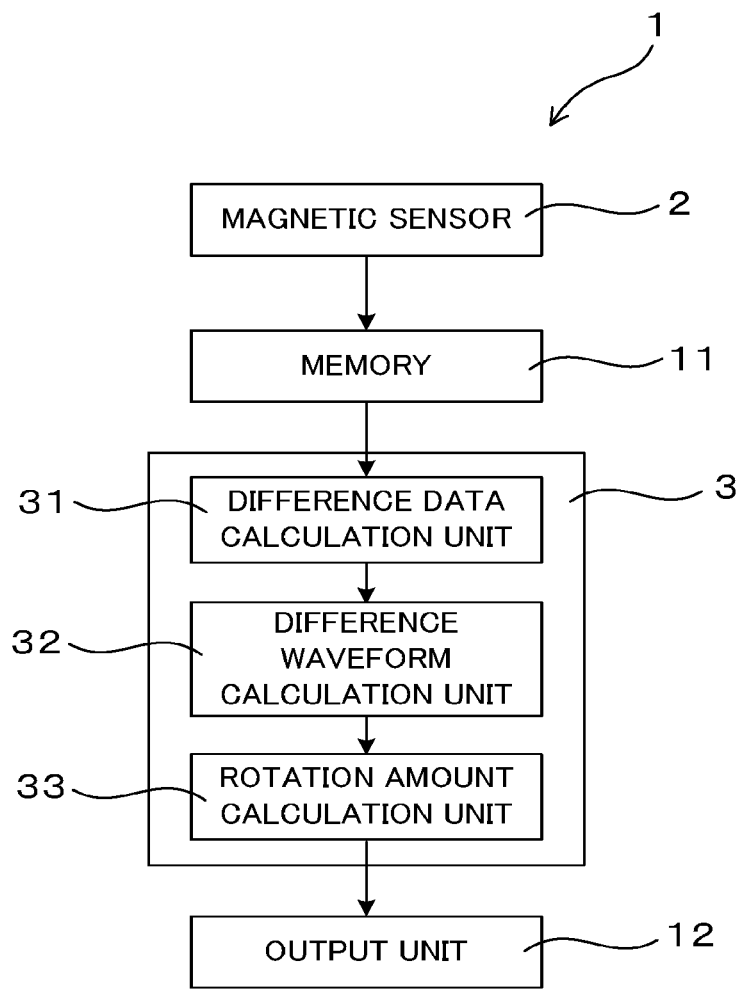
FIG. 1 is a conceptual diagram of a ball rotation amount measurement system according to Embodiment 1.

In the aforementioned ball rotation amount measurement system, the rotation amount of a ball to be computed by the computation unit may be defined as, for example, the number of rotations of the ball per unit time, the orientation change of the ball within an interval between predetermined two time points, etc.

The ball rotation amount measurement system may be configured as a system for measuring the rotation amount of a ball thrown by a baseball pitcher, for example. In this case, the system may be configured to measure, for example, the number of rotations, i.e., the rotation speed of the ball per unit time. Alternatively, the system may be configured to measure, for example, the rotation amount of the ball from a time point when the pitcher releases the ball to a time point when a catcher catches the ball.

The difference data calculation unit may be configured to calculate, as the difference data, the difference between two of the time-sequential geomagnetic data adjacent to each other to thereby time-sequentially obtain a large number of the difference data.

In this case, when the rotation amount of the ball is relatively large, for example, the rotation amount can be effectively measured with high accuracy. On the other hand, when the rotation amount of the ball is relatively small, the difference between the geomagnetic data that are time-sequentially adjacent among the acquired geomagnetic data does not necessarily have to be obtained, and the difference between geomagnetic data that are time-sequentially shifted from each other by two or more data may be calculated as the difference data.

The rotation amount calculation unit may be configured to calculate the rotation amount of the ball, based on a crossing number that is the number of crossing between the difference waveform and the straight line indicating zero-difference within a predetermined interval.

With the aforementioned configurations, for example, the following embodiments are made possible.

Specifically, there may be provided a ball rotation amount measurement system for measuring a rotation amount of a ball moving in midair, the system including:

a magnetic sensor fixed to the ball to measure geomagnetism in at least one axial direction; and a computation unit configured to compute the rotation amount of the ball by using data of a large number of the geomagnetism time-sequentially acquired by the magnetic sensor, wherein the computation unit includes:

a difference data calculation unit configured to calculate a difference between two of the time-sequential geomagnetic data adjacent to each other to thereby time-sequentially obtain a large number of difference data;

a difference waveform calculation unit configured to determine a difference waveform that represents a time variation waveform of a large number of the difference data, and a rotation amount calculation unit configured to calculate the rotation amount of the ball, based on a crossing number that is the number of crossing between the difference waveform and the straight line indicating zero-difference within a predetermined interval.

For example, when the number of rotations of the ball per unit time is measured, the unit time is the predetermined interval as mentioned above. For example, when the rotation amount of the ball from a time point when a pitcher releases the ball to a time point when a catcher catches the ball is measured, the time period from the time point when the pitcher releases the ball to the time point when the catcher catches the ball is the predetermined interval as mentioned above.

The rotation amount calculation unit may be configured to calculate a rotation speed of the ball, based on the crossing number per unit time. In this case, the number of rotations, i.e., the rotation speed of the ball per unit time can be measured with accuracy.

Alternatively, the rotation amount calculation unit may be configured to calculate a rotation speed of the ball, based on a time interval between the time-sequential zero cross points.

In this case, the rotation speed of the ball can be easily calculated at an arbitrary time point during movement in midair, for example. At each of a plurality of time points during movement in midair, the rotation speed of the ball can be easily calculated, for example.

The magnetic sensor is preferably configured to measure the geomagnetism in a plurality of axial directions that are different from one another, and the difference data calculation unit is preferably configured to calculate the difference data by using geomagnetic data having the largest amplitude among the geomagnetic data obtained in the plurality of axial directions. In this case, such a situation that geomagnetic data having small amplitude is only obtained depending on the rotation direction of the ball relative to the direction of the geomagnetism, can be suppressed. Consequently, the rotation amount of the ball can be more reliably measured with accuracy.

Moreover, the magnetic sensor is preferably configured to measure the geomagnetism in three axial directions that are orthogonal to one another. In this case, when the ball is rotating in an arbitrary rotation direction, the geomagnetic data having large amplitude, can be obtained in any one of the three axis directions. Consequently, the rotation amount of the ball can be accurately measured, irrespective of the rotation direction of the ball.

Also, the computation unit may be configured to further include a vector calculation unit configured to calculate a geomagnetism vector, based on the geomagnetic data obtained in the three axial directions by the magnetic sensor, and an orientation change amount calculation unit configured to determine an orientation change amount of the ball during an interval between a starting time point and an ending time point of midair movement of the ball, and the orientation change amount calculation unit may be configured to calculate the orientation change amount of the ball, based on a starting vector that is the geomagnetism vector obtained by the vector calculation unit at the starting time point, and an ending vector that is the geomagnetism vector obtained by the vector calculation unit at the ending time point.

In this case, the rotational angle of the ball during the interval between the movement starting time point and the movement ending time point can be calculated. The orientation change amount calculation unit is particularly useful for a case where the number of crossing within the interval between the movement starting time point and the movement ending time point is less than two, and for a case of a low speed rotation equivalent to the case earlier mentioned, for example.

Alternatively, the computation unit may be configured to further include a vector calculation unit configured to calculate a geomagnetism vector, based on the geomagnetic data obtained in the three axial directions by the magnetic sensor, and an in-movement orientation change amount calculation unit configured to determine an orientation change amount of the ball during an interval between a first time point and a second time point of midair movement of the ball, and the in-movement orientation change amount calculation unit may be configured to calculate the orientation change amount of the ball, based on a first time point vector that is the geomagnetism vector obtained by the vector calculation unit at the first time point, and a second time point vector that is the geomagnetism vector obtained by the vector calculation unit at the second time point.

In this case, the orientation change amount of the ball in a predetermined interval during movement in midair can be obtained. Note that a plurality of the first time points and a plurality of the second time points may be present during movement in midair.

In addition, the system preferably further includes an acceleration sensor fixed to the ball to measure acceleration in at least one axial direction; and a start detection unit and an end detection unit configured to detect the starting time point and the ending time point of the midair movement of the ball, respectively, based on acceleration data acquired by the acceleration sensor. In this case, the starting time point and the ending time point of midair movement of the ball can be easily obtained.

Moreover, the acceleration sensor is preferably configured to measure the acceleration in a plurality of axial directions that are different one another. In this case, when acceleration acts on the ball in an arbitrary direction, acceleration data that is sufficiently large can be easily acquired. Consequently, the movement starting time point and the movement ending time point can be accurately detected by the start detection unit and the end detection unit, respectively.

Furthermore, the acceleration sensor is preferably configured to measure the acceleration in three axis directions which are orthogonal to one another. In this case, when acceleration acts on the ball in an arbitrary direction, acceleration data that is sufficiently large can be easily obtained in any one of the three axis directions. Consequently, the movement starting time point and the movement ending time point can be accurately discerned, irrespective of the direction of the acceleration acting on the ball.

Moreover, the magnetic sensor is preferably constituted by a magneto-impedance sensor. In this case, the rotation amount of the ball can be measured with higher accuracy. That is, the magneto-impedance sensor (hereinafter, also referred to as "MI sensor") is excellent in detection sensitivity and responsivity, and thus, geomagnetism can be accurately detected and the measurement interval can be extremely shortened. Accordingly, even when the ball is rotating at high speed, the rotation amount of the ball can be measured more accurately.

Embodiment 1

Embodiments of the ball rotation amount measurement system will be described with reference to FIGS. 1 to 6.

A ball rotation amount measurement system 1 measures the rotation amount of a ball moving in midair.

As illustrated in FIG. 1, the ball rotation amount measurement system 1 includes a magnetic sensor 2 and a computation unit 3. The magnetic sensor 2 is fixed to the ball, and measures geomagnetism in at least one axial direction. The computation unit 3 computes the rotation amount of the ball by using data of a large number of the geomagnetism time-sequentially acquired by the magnetic sensor 2. The computation unit 3 includes a difference data calculation unit 31, a difference waveform calculation unit 32, and a rotation amount calculation unit 33.

The difference data calculation unit 31 calculates, as the difference data, the difference between two of the time-sequential geomagnetic data m(n) adjacent to each other to thereby time-sequentially obtain a large number of the difference data $\Delta m(n)$. Here, m(n) means a datum of geomagnetism time-sequentially acquired at n-th time. In addition, $\Delta m(n)$ is defined by $\Delta m(n)=m(n)-m(n-1)$.

Figure 3:
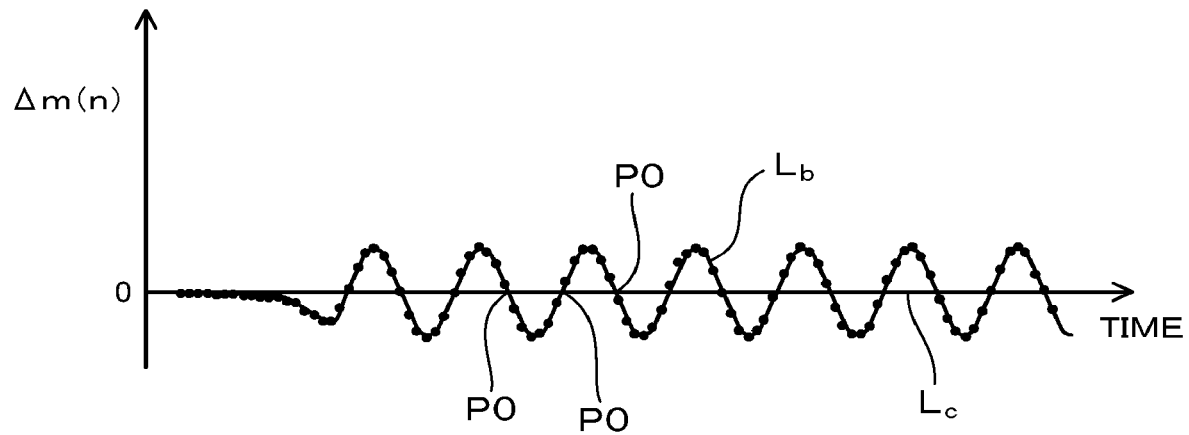
FIG. 3 is a diagram showing a difference waveform according to Embodiment 1.

The difference waveform calculation unit 32 determines a difference waveform Lb that represents a time variation waveform of a large number of the difference data $\Delta m(n)$ (see FIG. 3).

The rotation amount calculation unit 33 calculates the rotation amount of the ball, based on a crossing number that is the number of crossing between the difference waveform Lb and the straight line Lc indicating zero-difference within a predetermined interval. Note that the straight line Lc indicating zero-difference means a straight line drawn along the time axis at $\Delta m(n)=0$ in the graph showing the time variation of the difference data $\Delta m(n)$ in FIG. 3.

Figure 2:
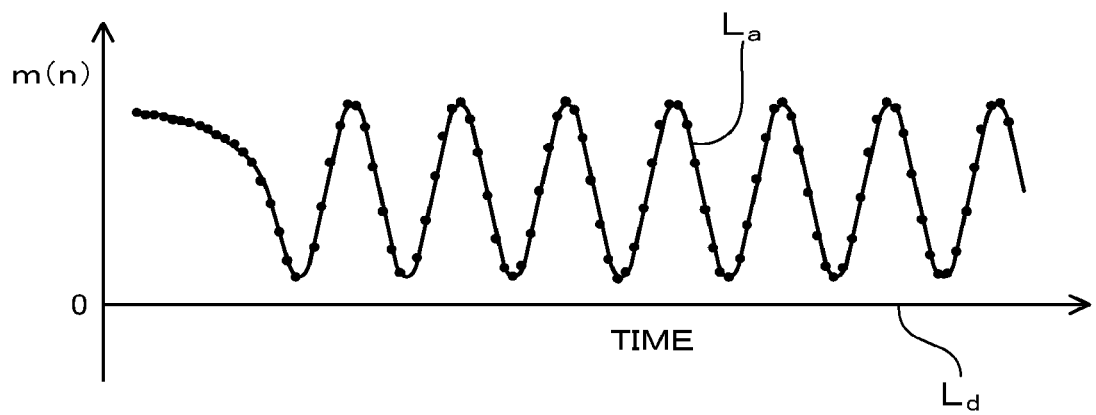
FIG. 2 is a diagram showing the time differentiation of geomagnetic data according to Embodiment 1.

In addition, a graph of time variation La of the geomagnetic data m(n) is shown in FIG. 2. In FIG. 2, each of a large number of dots shown in the graph represents each geomagnetic datum m(n). Similarly, in FIG. 3, each of a large number of dots shown in the graph represents each difference datum $\Delta m(n)$.

In the present embodiment, the rotation amount calculation unit 33 is configured to calculate the rotation speed of the ball, based on the crossing number per unit time. That is, a half of the crossing number per unit time substantially matches the frequency of the time variation La of the geomagnetic data. Thus, the half of the crossing number per unit time is regarded as the frequency of the time variation of the geomagnetic data, whereby the rotation speed of the ball is calculated. For example, when the crossing number in 0.3 seconds is 27, the frequency of the time variation of the geomagnetic data is considered to be 45 Hz, so that the rotation speed of the ball is calculated to be 45 rotations per second.

Furthermore, the magnetic sensor 2 is configured to measure the geomagnetism in a plurality of axial directions that are different from one another. The difference data calculation unit 31 calculates the difference data by using geomagnetic data having the largest amplitude among the geomagnetic data obtained in the plurality of axial directions.

In the present embodiment, the magnetic sensor 2 is configured to measure the geomagnetism in three axial directions that are orthogonal to one another. The difference data is calculated using geomagnetic data having the largest amplitude among the geomagnetic data obtained in the three axial directions. Unless otherwise stated, the geomagnetic data in the present embodiment means geomagnetic data having the largest amplitude among the geomagnetic data obtained in the three axial directions. In addition, unless otherwise stated, the difference data means difference data calculated using said geomagnetic data.

Figure 6:
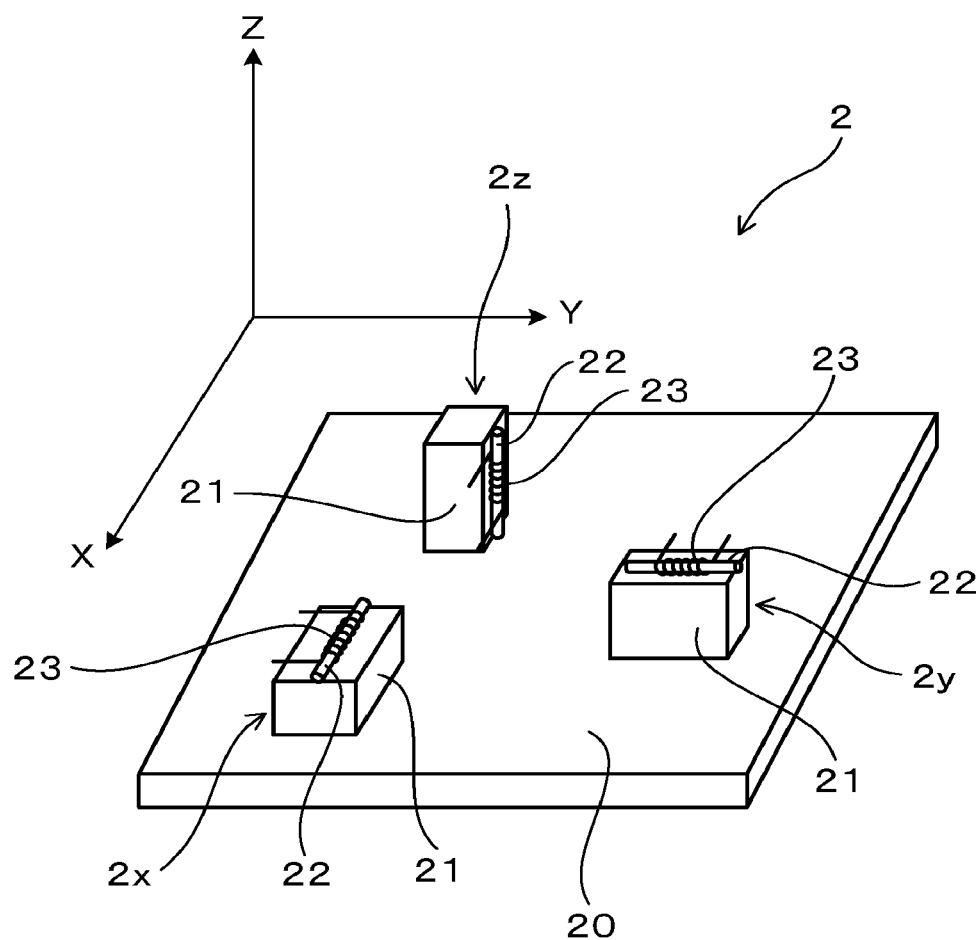
FIG. 6 is an explanatory perspective view of a magnetic sensor according to Embodiment 1.

As illustrated in FIG. 6, the magnetic sensor 2 is formed by disposing three sensor elements 2$x$, 2$y$, 2$z$ on a sensor substrate 20 in such a manner that each sensitivity direction of the sensor elements 2$x$, 2$y$, 2$z$ is directed to three axial directions (X direction, Y direction, Z direction) that are orthogonal to one another, respectively. The sensor elements 2$x$, 2$y$, 2$z$ are each constituted by a magneto-impedance sensor element.

The sensor elements 2$x$, 2$y$, 2$z$ each include a base body part 21 composed of a non-magnetic body, an amorphous wire 22 fixed to the base body part 21, and a detection coil 23 wound around the amorphous wire 22. The magnetic sensor 2 can detect geomagnetic data in the X-axis direction, geomagnetic data in the Y-axis direction, and geomagnetic data in the Z-axis direction, based on the intensities of the geomagnetism in the respective axial directions detected by the sensor elements 2$x$, 2$y$, and 2$z$.

In the present embodiment, both the magnetic sensor 2 and the computation unit 3 are incorporated in the ball. Further, the ball rotation amount measurement system 1 includes a geomagnetic data memory 11 that stores the data of a large number of the geomagnetism acquired by the magnetic sensor 2. The memory 11 is also incorporated in the ball. Further, the ball rotation amount measurement system 1 includes an output unit 12 that outputs the rotation amount of the ball computed by the computation unit 3. In the present embodiment, the output unit 12 is a display unit for visually displaying a measurement result. That is, the rotation speed of the ball is displayed on the display unit that is the output unit 12. The output unit 12 may be attached to the ball, or may be provided separately from the ball. When the output unit 12 is separated from the ball, the computation result is transmitted from the computation unit 3 incorporated in the ball to the output unit 12 by wireless communication. Note that, needless to say, data of detected geomagnetism itself may be wirelessly transmitted to the outside of the ball, a computation unit provided in a personal computer, a smartphone, or the like that has received the data outside, may perform computation, and then, the result may be outputted.

Operation of the ball rotation amount measurement system 1 of the present embodiment will be described on the assumption that the rotation speed of a ball thrown by a baseball pitcher toward a catcher is to be measured.

A ball thrown by a pitcher normally moves in midair while rotating. For example, when a professional baseball pitcher pitches a straight ball (straight), the ball can rotate at as high speed as 40 to 50 rotations per second.

The magnetic sensor 2 sequentially detects geomagnetism while the ball is moving in midair. The detected geomagnetism is time-sequentially stored as a large number of geomagnetic data m(n) in the memory 11. Here, as described above, the magnetic sensor 2 measures the geomagnetism in three axial directions that are orthogonal to one another. Among the geomagnetic data obtained in the three axial directions, the geomagnetic data having the largest amplitude is used.

Note that, in geomagnetism detection by the magnetic sensor 2, detection is performed at a frequency of 250 times/second or higher, for example. That is, the measurement interval is set to 4 ms or less, for example. More specifically, in the present embodiment, detection is performed at a frequency of 500 times/second, that is, the acquisition interval of the geomagnetic data m(n) is set to 2 ms.

The magnetic sensor 2 is fixed to the ball that moves in midair while rotating. Therefore, unless the rotation axis of the ball matches the direction of the geomagnetism, the geomagnetic data m(n) obtained by the magnetic sensor 2 periodically varies. FIG. 2 shows the time variation La of the geomagnetic data m(n). Here, when the output value of the magnetic sensor 2 is affected by nothing but the geomagnetism and when an angle formed between the rotation axis and the geomagnetism is sufficiently large, the time variation La of the geomagnetic data of at least one of the geomagnetic data in the three axis directions, forms a sine wave-like waveform crossing over the straight line Ld indicating zero-output along the time axis. Further, a sine wave-like waveform uniformly having amplitudes on plus and minus sides of a zero-output indicating straight line Ld along the time axis as a center, may be obtained depending on the relationship between the direction of the rotation axis and the sensing direction of the magnetic sensor. Thus, it is conceivable to calculate the number of rotations of the ball per unit time from the frequency of the sine wave-like wave.

However, in actuality, due to the influence of a peripheral magnetic field, other than the geomagnetism, for example, generated from an electric component in the surrounding area of the magnetic sensor 2, the time change La of the geomagnetic data outputted by the magnetic sensor 2 may form a waveform offset from the straight line Ld indicating zero-output toward the plus side or the minus side, as shown in FIG. 2.

In addition, even if there is no influence of the peripheral magnetic field, an angle formed between the rotation axis and the geomagnetism is excessively small, the time variation La of the geomagnetic data may form a waveform offset from the straight line Ld indicating zero-output toward the plus side or the minus side, similarly.

As a result, no zero cross point may be obtained in the waveform of the time variation La of the geomagnetic data, or if obtained, an interval between zero cross points may be greatly varied.

Furthermore, as described above, the interval for detecting geomagnetism by the magnetic sensor 2 is set to be as very narrow as 4 ms or shorter, for example, but there is a limit to this. As a result, the number of detectable data has a limit. For example, in a case where the method of Patent Document 1 is used, the accuracy of measurement of the number of rotations is deteriorated.

Therefore, the computation unit 3 does not use the geomagnetic data m(n) as it is, but obtains a large number of the difference data Δm(n) based on a large number of the geomagnetic data m(n). Specifically, for example, when there are time-sequentially geomagnetic data m(k−2), m(k−

Figure 4:
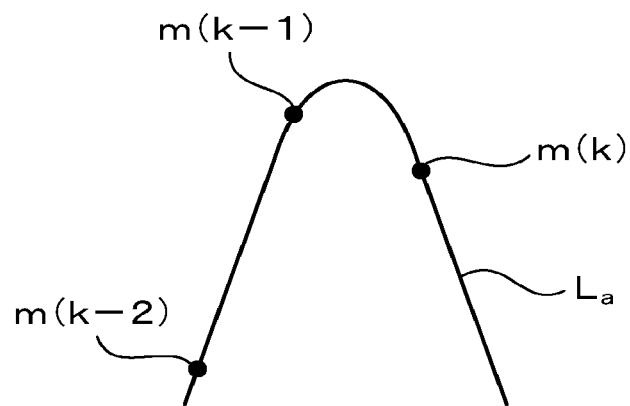
FIG. 4 is a diagram showing a vicinity of an inflexion point of the time differentiation of the geomagnetic data according to Embodiment 1.

1), m(k) as shown in FIG. 4, difference data Δm(k−1) and Δm(k) are obtained based on these geomagnetic data. Here, Δm(k−1)=m(k−1)−m(k−2), and Δm(k)=m(k)−m(k−1). In this way, the difference data calculation unit 31 time-sequentially obtains a large number of the difference data Δm(n) by calculating, as the difference data, the difference between two of the time-sequential geomagnetic data adjacent to each other.

The large number of the difference data Δm(n) also time-sequentially varies. The difference waveform Lb, that is, a waveform representing the time variation of the difference data Δm(n) is acquired by the difference waveform calculation unit 32. The difference waveform Lb forms a sine wave-like waveform having the straight line Lc indicating zero-difference as a center, as shown in FIG. 3. Since the difference data Δm(n) is the difference between two time-sequential geomagnetic data adjacent to each other, difference data obtained at top peaks and bottom peaks of the time variation La of the geomagnetic data, is zero. However, the acquisition interval for acquiring the difference data Δm(n) is equal to the acquisition interval for acquiring the geomagnetic data m(n), and cannot be shortened to the utmost limit, so that a timing at which the difference data Δm(n) itself becomes zero does not periodically come.

Figure 5:
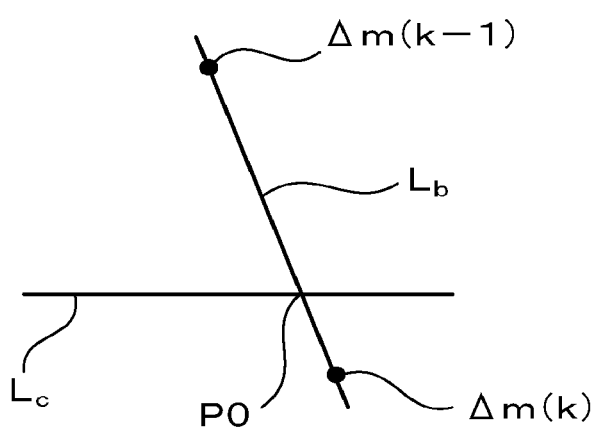
FIG. 5 is a diagram showing a vicinity of a zero cross point of the difference waveform according to Embodiment 1.

However, as shown in FIG. 3, the difference waveform Lb forms a sine wave-like waveform having a straight line Lc indicating zero-difference as a center, and thus, necessarily crosses the straight line Lc periodically. That is, as shown in FIGS. 4 and 5, among a plurality of difference data in the vicinity of an inflexion point of the time change La of the geomagnetic data, one of two time-sequentially adjacent difference data Δm(k−1), Δm(k) is minus while the other is plus. This state is not affected even when the time variation La of the geomagnetic data is offset due to an influence of the magnetic field from a component in the surrounding area of the magnetic sensor 2, etc.

Moreover, even when the waveform of the time variation La of the geomagnetic data is offset based on the relation between the orientation of the magnetic sensor 2 and the rotation axis, the difference waveform Lb periodically crosses the straight line Lc.

As a result, the difference waveform Lb surely crosses the straight line Lc indicating zero-difference in a part (part shown in FIG. 5) of a time zone corresponding to the vicinity of an inflexion point of the time variation La of the geomagnetic data. For this reason, the zero cross point P0 is surely obtained in a substantially periodical manner, as shown in FIG. 3. Therefore, the number of zero cross points P0 per unit time, that is, the number of crossing per unit time can be ensured.

The rotation amount calculation unit 33 of the computation unit 3 calculates the number of rotations of the ball per unit time, that is, the rotation speed of the ball, based on the number of crossing. Alternatively, needless to say, the rotation speed of the ball may be calculated based on the time interval between time-sequential zero cross points P0.

The calculated rotation speed of the ball is displayed on the output unit 12.

Note that, in order to calculate the zero cross point P0, for example, linear approximation is made between two difference data Δm(k−1) and Δm(k) to determine an intersection between the approximate straight line thus obtained and the straight line Lc indicating zero-difference as the zero cross point P0, as shown in FIG. 5.

As described above, the ball rotation amount measurement system 1 can calculate the rotation amount of a ball with accuracy even when the ball is rotating at high speed.

In particular, in the present embodiment, the rotation amount calculation unit 33 calculates the rotation speed of the ball, based on the number of crossing per unit time. Accordingly, the number of rotations of the ball per unit time, that is, the rotation speed of the ball can be measured with accuracy.

Moreover, the magnetic sensor 2 measures the geomagnetism in three axial directions that are orthogonal to one another, and the difference data calculation unit 31 calculates the difference data by using geomagnetic data having the largest amplitude among the geomagnetic data obtained in the three axis directions. Accordingly, when the ball rotates in an arbitrary rotation direction, geomagnetic data having a large amplitude can be obtained in any one of the three axis directions. As a result, the rotation amount of the ball can be accurately measured, irrespective of the ball rotation direction with respect to the direction of the geomagnetism.

Also, since the magnetic sensor 2 is constituted by a MI sensor, the rotation amount of the ball can be measured with higher accuracy. That is, the MI sensor is excellent in detection sensitivity and responsivity, and thus, the MI sensor can detect geomagnetism with accuracy, and can perform accurate detection even when the measurement interval is shortened as compared to other magnetic sensors. Consequently, even when the ball is rotating at high speed, the rotation amount of the ball can be measured with accuracy.

As described above, the aforementioned embodiment can provide a ball rotation amount measurement system that is capable of measuring the rotation amount of a ball with high accuracy.

Embodiment 2

Figure 7:
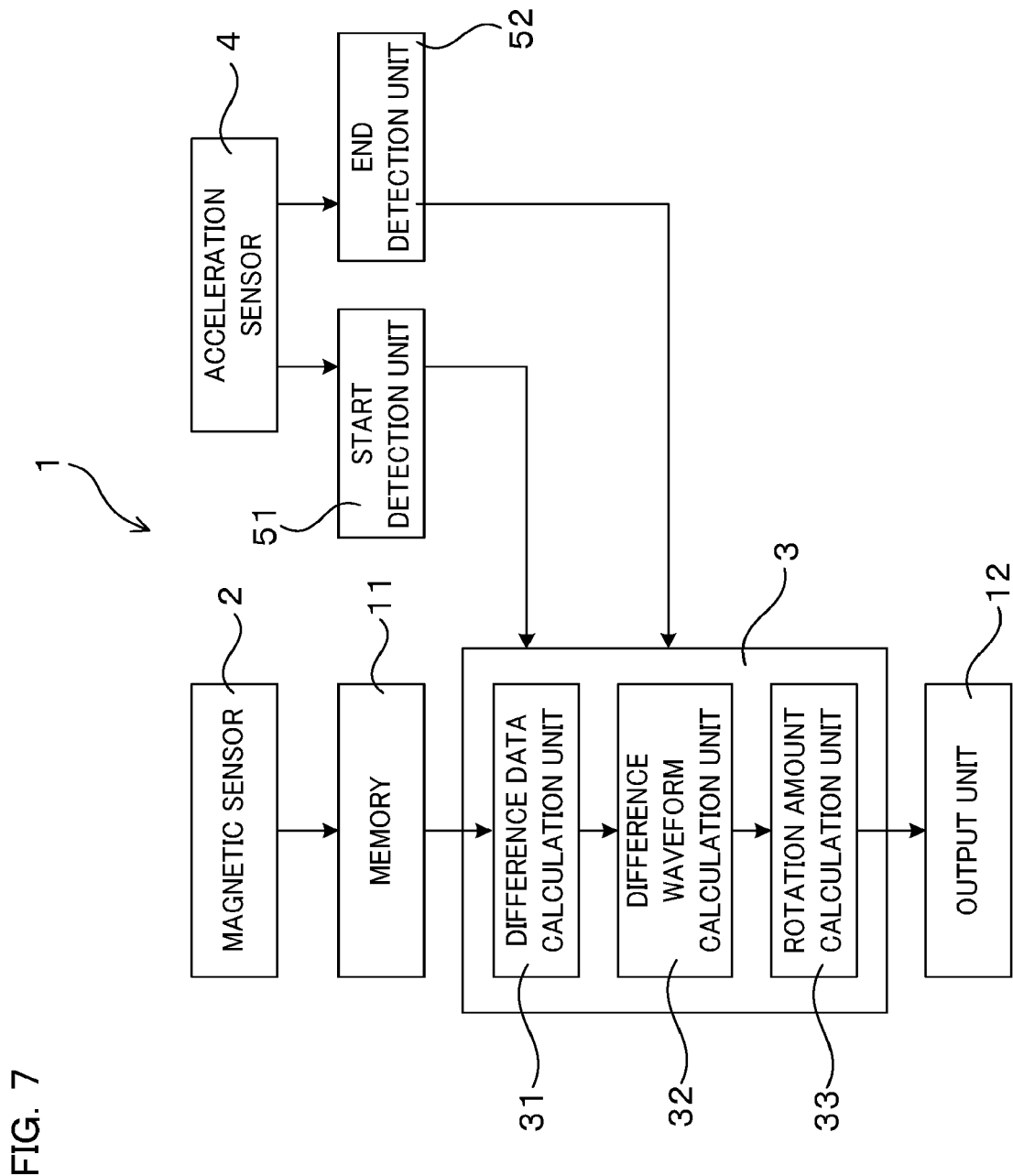
FIG. 7 is a conceptual diagram of a ball rotation amount measurement system according to Embodiment 2.

As illustrated in FIG. 7, the ball rotation amount measurement system 1 of the present embodiment includes an acceleration sensor 4, a start detection unit 51, and an end detection unit 52.

The acceleration sensor 4 is fixed to a ball, and measures acceleration in at least one axial direction. The start detection unit 51 and the end detection unit 52 detect the starting time point and the ending time point of midair movement of the ball, respectively, based on acceleration data acquired by the acceleration sensor 4.

The acceleration sensor 4 is configured to measure the acceleration in three axis directions that are orthogonal to one another. Data acquired in an axial direction on which the acceleration or the change amount of the acceleration per unit time is the largest at the time point determined to be immediately before the starting time point and the time point determined to be immediately after the ending time point of midair movement of the ball, is used as described below.

When the ball starts to move in midair, a large impact is applied from fingers of a pitcher to the ball. Subsequently, after the ball is released from the fingers of the pitcher, a force acting on the ball only includes air resistance, which is much smaller than the impact applied from the fingers of the pitcher and the change amount of which is also small. Therefore, the time point when an acceleration equal to or greater than a certain threshold has been detected immediately before the acceleration detected by the acceleration sensor 4 is continuously small, can be recognized as the starting time point of midair movement of the ball.

In addition, when movement of the ball in midair ends, a large impact is applied to the ball as a result of, for example, collision of the ball with a catcher's mitt, a batter's bat, or the ground. The impact applied to the ball can be measured as large acceleration. The acceleration is detected by the acceleration sensor 4, and the end detection unit 52 determines the ending time point, based on the detection signal.

In association with this, the ball rotation amount measurement system 1 can recognize that the ball is moving in midair during the interval between the starting time point detected by the start detection unit 51 and the ending time point detected by the end detection unit 52. Accordingly, the rotation amount of the ball can be measured only during this interval. That is, the rotation amount (rotation speed) of the ball is calculated by the computation unit 3, based on the geomagnetic data acquired during this interval.

Calculation of the rotation amount of the ball can be performed by the method described in Embodiment 1.

The other configurations are identical to those of Embodiment 1. Note that, unless otherwise stated, among reference numerals used in the second and the subsequent embodiments, reference numerals that are identical to those used in a previous embodiment denote components identical to those of the previous embodiments.

Note that, when the acceleration sensor 4 is arranged at a position largely deviated from the barycenter of the ball, a centrifugal force associated with rotation acts on the acceleration sensor 4. That is, the acceleration sensor 4 detects acceleration caused by the centrifugal force even during midair movement of the ball. Moreover, in the case where the output value of the acceleration sensor 4 is offset, that is, in the case where the output is shifted from zero while acceleration does not actually act, the acceleration sensor 4 gives a certain output or larger during midair movement of the ball. Under the assumption of such a situation, it is conceivable the start detection unit 51 and the end detection unit 52 may make determination based on the change amount of acceleration, as described below.

That is, when the ball starts to move in midair, the ball receives a large impact from finger tips of a pitcher, and fluctuation of the impact force (acceleration) occurs at the same time. Therefore, the starting time point of midair movement of the ball can be recognized as the time point when the state that fluctuation of the acceleration is large (hereinafter referred to as a state of large fluctuation) has been detected immediately before fluctuation of detection value by the acceleration sensor 4 is continuously small (hereinafter referred to as a state of small fluctuation). Here, where the change amount of acceleration per unit time is equal to or greater than a certain threshold, such a state can be defined as a state of large fluctuation, and where the change amount is less than the threshold, such a state can be defined as a state of small fluctuation.

In addition, impact at the time of ending midair movement of the ball has fluctuation in its impact force. In other words, it causes fluctuation in acceleration. This fluctuation in the acceleration is detected by the acceleration sensor 4, and the end detection unit 52 determines the ending time point, based on the detection signal. Specifically, in the time period including the time during midair movement of the ball and the time before and after the midair movement, the state of large fluctuation is caused at the beginning, and next the state of small fluctuation is caused, and once again the state of large fluctuation is caused sequentially. Accordingly, the time point when the state of large fluctuation shifts to the state of small fluctuation first can be regarded as the starting time point, and the time point when the state of small fluctuation is shifted to the state of large fluctuation subsequently can be regarded as the ending time point. Note that JP-A-2017-26427 describes a method for determining a starting time point and an ending time point based on the change amount of acceleration in detail.

Accordingly, even in a case where the acceleration sensor 4 is provided at a position greatly deviated from the barycenter of the ball or where the output value of the acceleration sensor 4 is offset, the starting time point and the ending time point can be discerned without suffering the influence of such configurations.

As described above, in the present embodiment, the starting time point and the ending time point of midair movement of the ball can be easily detected by use of the acceleration sensor 4.

In addition, operational effects identical to those of Embodiment 1 are achieved.

Embodiment 3

Figure 8:
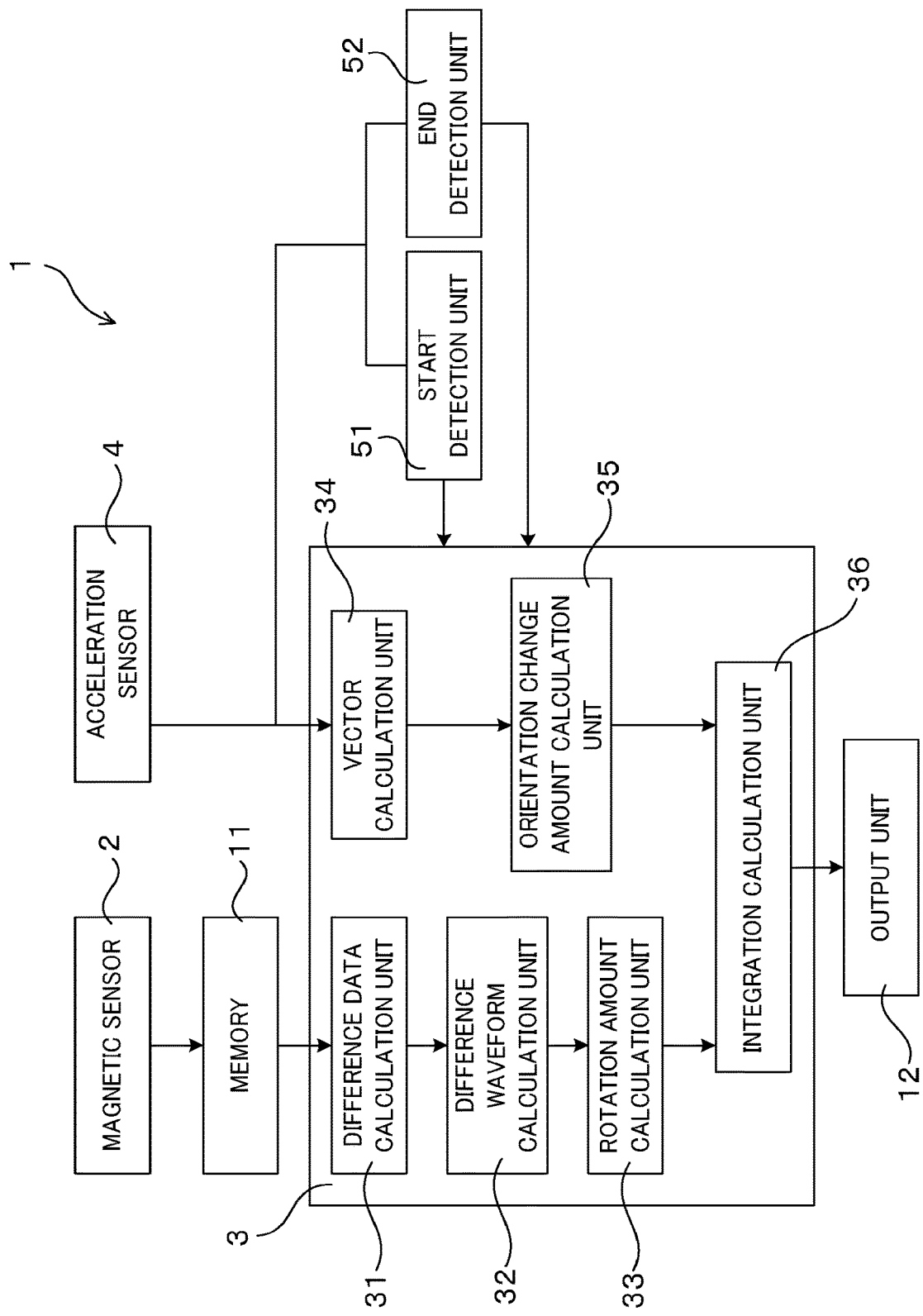
FIG. 8 is a conceptual diagram of a ball rotation amount measurement system according to Embodiment 3.

In the present embodiment, as illustrated in FIG. 8, the computation unit 3 further includes a vector calculation unit 34 and an orientation change amount calculation unit 35 mentioned below.

The vector calculation unit 34 calculates a geomagnetism vector, based on the geomagnetic data obtained in three axial directions by the magnetic sensor 2.

The orientation change amount calculation unit 35 determines the orientation change amount of the ball from the starting time point to the ending time point of midair movement of the ball.

The orientation change amount calculation unit 35 calculates the orientation change amount of the ball, based on a starting vector Ms that is the geomagnetism vector obtained by the vector calculation unit 34 at the starting time point, and an ending vector Me that is the geomagnetism vector obtained by the vector calculation unit 34 at the ending time point.

Note that, the starting vector Ms may be, for example, a geomagnetism vector based on the geomagnetic data acquired immediately after the time point determined as a starting time point. Also, the ending vector Me may be, for example, a geomagnetism vector based on the geomagnetic data acquired immediately before the time point determined as an ending time point.

Specifically, the orientation change amount calculation unit 35 calculates the orientation change amount of the ball, for example, by the following method.

Figure 9:
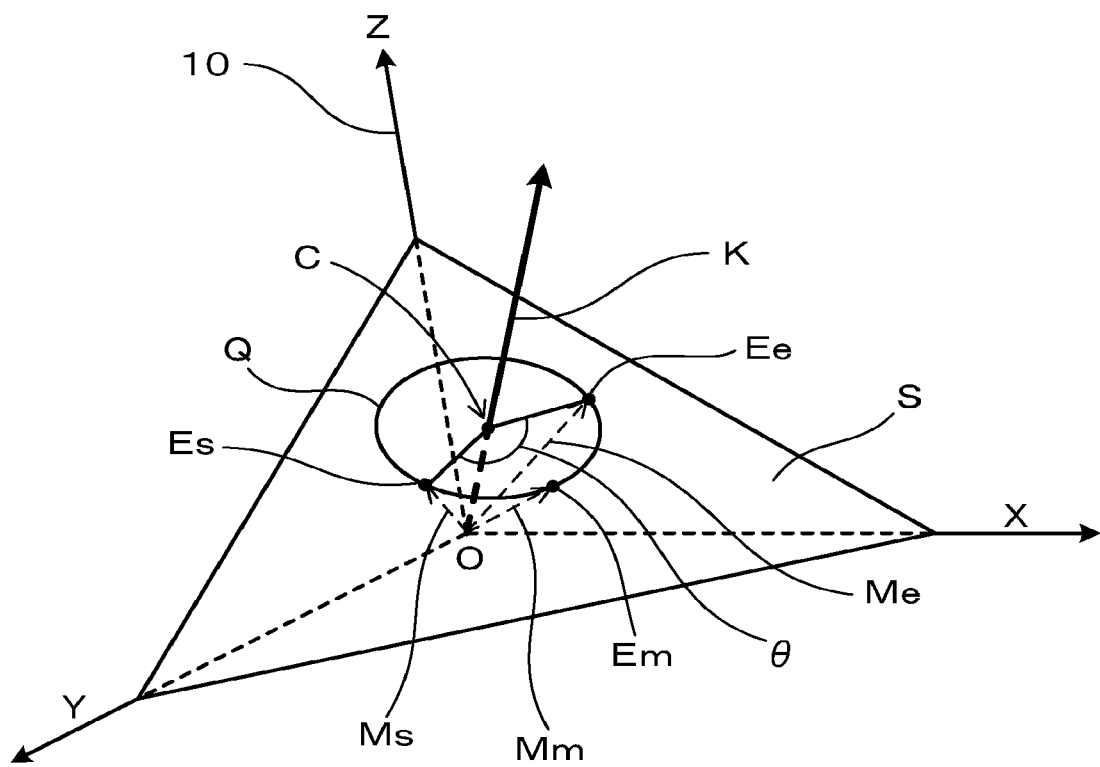
FIG. 9 is an illustration of a method for calculating an orientation change amount according to Embodiment 3.

That is, data of the geomagnetism vectors detected in three axial directions by the magnetic sensor fixed to the ball can be regarded as geomagnetism vectors Ms, Mm, Me in a three-axis orthogonal coordinate system 10 fixed to the ball, as shown in FIG. 9. Then, in the three-axis orthogonal coordinate system 10, a rotation axis K of the ball is determined, and orientation change of the ball is calculated, based on the relationship between the starting vector Ms and the ending vector Me with respect to the rotation axis K as a center. Note that the X-axis, Y-axis, Z-axis directions of the three-axis orthogonal coordinate system 10 shown in FIG. 9 is not particularly required to be coincident with the X-axis, Y-axis, Z-axis directions of the magnetic sensor 2 shown in FIG. 6, respectively.

The geomagnetism vectors Ms, Mm, Me at three different time points are drawn in the three-axis orthogonal coordinate system 10, as shown, for example, in FIG. 9. Among the three different time points, the first time point is the starting time point of midair movement of the ball, and the last point is the ending time point of the midair movement of the ball. That is, the three geomagnetism vectors Ms, Mm, Me include the starting vector Ms and the ending vector Me. The remaining geomagnetism vector Mm is the geomagnetism vector at the middle time point between the starting time point and the ending time point. Although the geomagnetism vector Mm may be acquired in plural, here is provided an explanation for the case of single use of geomagnetism vector Mm.

Terminal points Es, Em, Ee of the three geomagnetism vectors Ms, Mm, Me take a position on the circumference of one locus circle Q formed on one data plane S in the three-axis orthogonal coordinate system 10. An axis that is orthogonal to the data plane S and passes through the center C of the locus circle Q forms the rotation axis K in the three-axis orthogonal coordinate system 10. That is, the geomagnetism vectors are rotated about the rotation axis K, and the rotation axis K serves as the rotation axis of the ball.

An angle θ, which is formed between a straight line connecting the center C of the locus circle Q and the terminal point Es of the starting vector Ms and a straight line connecting the center C of the locus circle Q and the terminal point Ee of the ending vector Me, is obtained. The angle θ is the rotation angle of the ball during the interval from the starting time point to the ending time point. That is, the rotation angle θ of the ball can be calculated as the orientation change amount of the ball. Note that WO2007/099599 describes one example of a method for calculating the aforementioned angle θ in detail.

The ball rotation amount measurement system 1 of the present embodiment can be used, for example, as follows.

That is, when the rotation amount of the ball during midair movement of the ball is extremely small, it is conceivable to use the orientation change amount calculation unit 35.

That is, when the number of crossing as mentioned above, during the interval from the starting time point to the ending time point is plural, the rotation amount of the ball during the interval from the starting time point to the ending time point can be obtained at least by the rotation amount calculation unit shown in Embodiment 1. However, when the number of crossing during the interval from the starting time point to the ending time point is less than two, it is possible to determine that the ball made almost no rotation (less than half rotation), but it is not possible to perform further calculation related to the rotation amount. For example, when a knuckleball, a forkball, or the like is pitched, the ball is expected to hardly rotate during the midair movement. Also in such a case, there is a demand for finding out how little the ball rotates, in some cases. The orientation change amount calculation unit 35 described in the present embodiment helps in such a case.

Furthermore, the ball rotation amount measurement system 1 of the present embodiment may also be used as follows.

When the number of crossing during the interval from the starting time point to the ending time point is two or more, the rotation amount of the ball can be calculated by the rotation amount calculation unit 33, as described above. However, information cannot be obtained in such a level as 0.8 rotations or 1.3 rotations. Such information is considered to be useful when the aforementioned knuckleball or forkball is intended for measurement. Therefore, it is conceivable that the rotation amount calculation unit 33 and the orientation change amount calculation unit 35 may be used in combination.

Accordingly, in the present embodiment, the computation unit 3 can be configured to include an integration calculation unit 36 that calculates the rotation amount of the ball by integrating the result of calculation performed by the rotation amount calculation unit 33 and the result of calculation performed by the orientation change amount calculation unit 35, as illustrated in FIG. 8.

Specifically, when the rotation amount of the ball is one rotation as a result of calculation performed by the rotation amount calculation unit 33 and the orientation change amount of the ball (rotation angle θ) is 90° as a result of calculation performed by the orientation change amount calculation unit 35, the integration calculation unit 36 calculates the rotation amount of the ball during the interval from the starting time point to the ending time point to be 1.25 rotations.

Note that the computation unit 3 may be configured to decide to refrain from using the orientation change amount calculation unit 35 in the case where the rotation amount of the ball obtained by the rotation amount calculation unit 33 is sufficiently large. When the rotation amount of the ball during the interval from the starting time point to the ending time point is, for example, 10 rotations or more, it may be configured not to use the orientation change amount calculation unit 35 on the decision that detailed information including the orientation change of the ball (rotation angle), etc. is not necessary.

As described above, in the present embodiment, orientation change of a ball can be measured even when the rotation amount of the ball is excessively small. On the other hand, when the rotation speed of the ball is high, computation can be performed in the same manner as in Embodiment 1, whereby the rotation amount of the ball can be calculated with accuracy.

In addition, operational effects identical to those of Embodiment 1 are achieved.

Note that, in the case where the number of crossing during the interval from the starting time point to the ending time point is two or more, as mentioned above, it is conceivable to use a method not using the orientation change amount calculation unit 35 to measure detailed information such as 0.8 rotations or 1.3 rotations as the rotation amount of the ball. That is, the number of rotations can be estimated from the time interval between zero cross points P0 (see FIG. 3) obtained by the rotation amount calculation unit 33. That is, in the ball rotation amount measurement system, the clock times of zero crosses are also recorded in addition to the number of crossing. Simultaneously, the clock times of the starting time point and the ending time point are also recorded. Then, when the number of crossing is two, for example, the rotation amount of the ball such as being, for example, 0.8 rotations can be determined on the basis of the time difference between the first zero cross and the second zero cross and the time difference between the starting time point and the ending time point.

Embodiment 4

Figure 10:
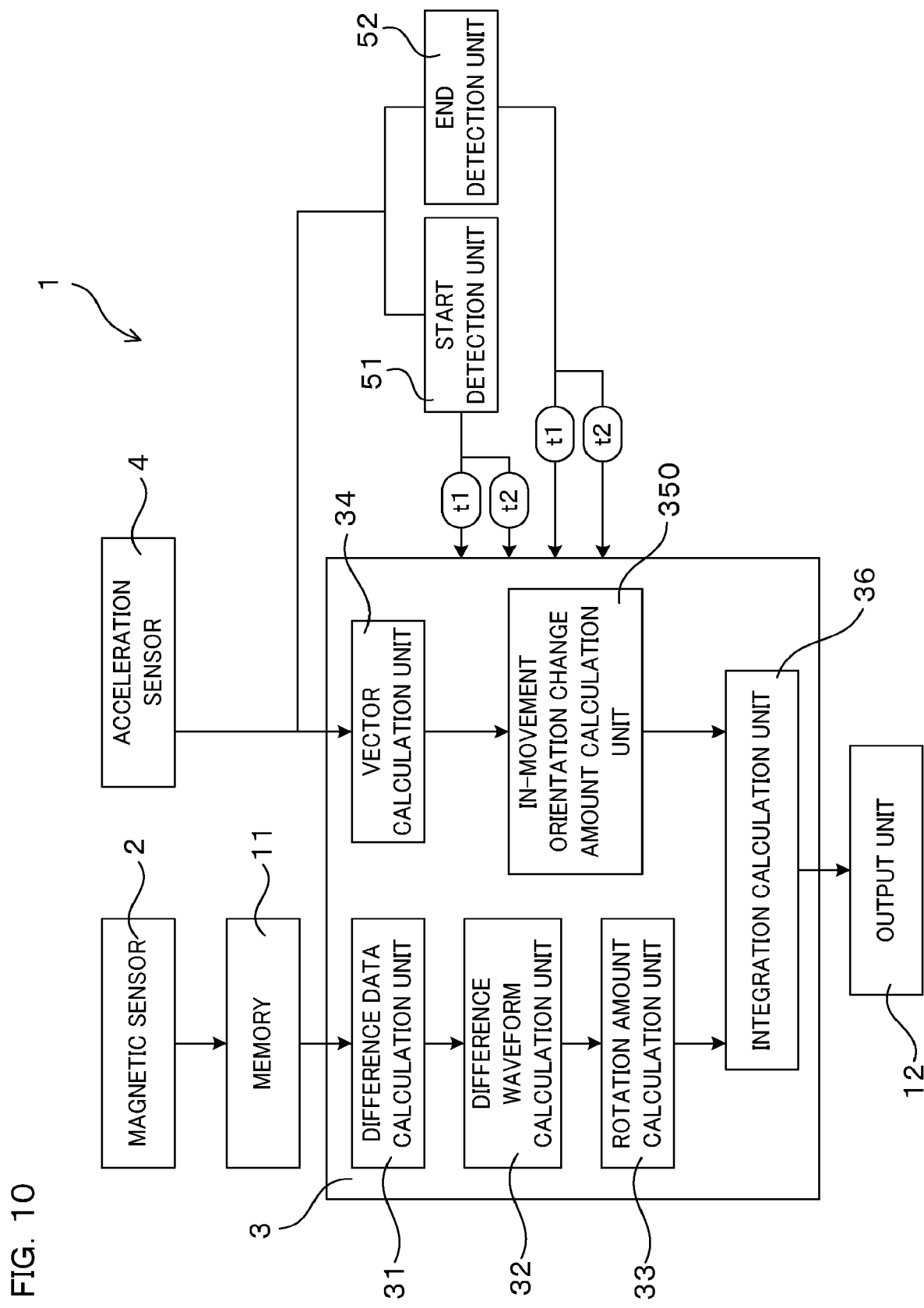
FIG. 10 is a conceptual diagram of a ball rotation amount measurement system according to Embodiment 4.

The present embodiment is a modification of Embodiment 3, and the computation unit 3 includes an in-movement orientation change amount calculation unit 350, as illustrated in FIG. 10.

The in-movement orientation change amount calculation unit 350 determines the orientation change amount of the ball during the interval from a first time point t1 to a second time point t2 in midair movement of the ball.

The in-movement orientation change amount calculation unit 350 calculates the orientation change amount of the ball, based on a first time point vector M1 that is a geomagnetism vector obtained at the first time point t1 by the vector calculation unit 34 and a second time point vector M2 that is a geomagnetism vector obtained at the second time point t2 by the vector calculation unit 34.

The in-movement orientation change amount calculation unit 350 calculates the orientation change amount of the ball within a predetermined interval in midair movement, by a method similar to that performed by the orientation change amount calculation unit 35 of Embodiment 3.

That is, among the geomagnetism vectors Ms, Mm, Me shown in FIG. 9, Ms may be considered to be replaced with a first time point vector M1, and Me may be considered to be replaced with a second time point vector M2. Further, a geomagnetism vector acquired between the first time point t1 and the second time point t2 may be regarded to be Mm.

Further, the first time point t1 and the second time point t2 may be set as, for example, two time points after a predetermined time has elapsed from the starting time point of midair movement of the ball. That is, for example, in order to calculate the rotation amount (orientation change amount) of the ball immediately after a pitcher releases the ball, the first time point t1 may be set at 0.05 seconds after the starting time point of the midair movement, and the second time point t2 may be set at 0.10 seconds after the starting time point. Further, for example, in order to calculate the rotation amount (orientation change amount) of the ball immediately before a catcher catches the ball, the first time point t1 may be set at 0.10 seconds before the ending time point of the midair movement, and the second time point t2 may be set at 0.05 seconds before the ending time point. The starting time point of midair movement and the ending time point of midair movement can be obtained by the method described in Embodiment 3.

Further, the first time point t1 and the second time point t2 may be set respectively in a plural number. According to this configuration, for example, the difference between the rotation amount (for example, the rotation amount or the orientation change amount within a time period of 0.05 seconds) of the ball immediately after the ball is released and the rotation amount (for example, the rotation amount or the orientation change amount within a time period of 0.05 seconds) of the ball immediately before the ball is caught can be detected. Moreover, by setting a plurality of the first time points t1 and the second time points t2, fluctuation of the rotation amount (orientation change amount) of the ball within a certain time period (for example, 0.05 seconds) during midair movement of the ball can be checked in more detail.

Note that, similar to the third embodiment, the present embodiment is useful for some kind of pitch having relatively small rotation amounts (e.g., knuckleballs and fork balls), but also can be used for some kind of pitch (e.g., straight balls or curve balls) having relatively large rotation amounts, according to the setting of the first time point and the second time point. The present embodiment is particularly useful for a case where it is required to accurately evaluate time variation of the rotation amount per unit time on the basis of the position of the ball moving in midair.

In addition, operational effects identical to those of Embodiment 1 are achieved.

Embodiment 5

Figure 11:
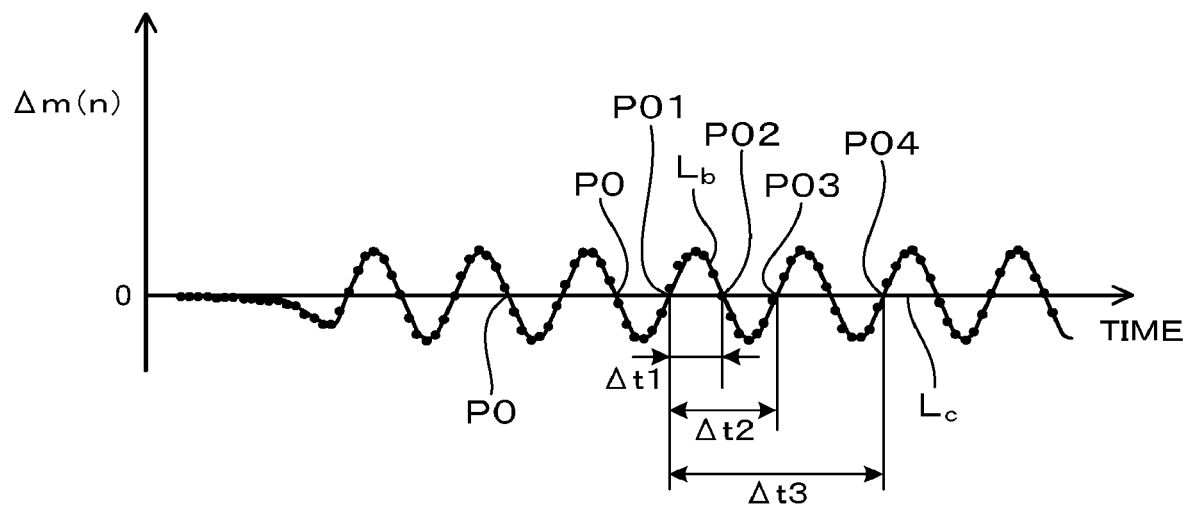
FIG. 11 is a diagram for explanation of a method for calculating the rotation speed of a ball according to Embodiment 5.

The present embodiment is one aspect of the ball rotation amount measurement system 1, which is configured such that the rotation amount calculation unit 38 calculates the rotation speed of the ball, based on the time interval between time-sequentially zero cross points P0, as shown in FIG. 11.

The present embodiment shows more specifically a method for calculating the rotation speed of the ball, based on the time interval between the zero cross points P0 of the difference waveform Lb in the ball rotation amount measurement system 1 of Embodiment 1. Therefore, the system itself is identical to that of the first embodiment.

That is, the rotation speed of the ball can be determined from the number of zero cross points P0 within a predetermined time period, as described in detail in Embodiment 1, but it can also be obtained from the time interval between time-sequentially zero cross points P0 as long as the detection accuracy of the magnetic sensor is sufficient. In particular, when a MI sensor is used as the magnetic sensor 2, calculation of the number of rotations can also be performed in such a way.

Specifically, calculation can be performed from a time $\Delta t$ between two zero cross points P0 and the number of tops (bottoms) of the difference waveform Lb which take a position between the two zero cross points P0. For example, when adjacent zero cross points P01, P02 are used as the time-sequential zero cross points, a half cycle of the difference waveform Lb takes a position in the time interval $\Delta t1$ between the two zero cross points P01, P02 so that the number of rotations of the ball is determined to be $0.5/\Delta t1$ (rotations) per unit time.

Moreover, when P01 and P03 are used as the time-sequential zero cross points, one cycle of the difference waveform Lb takes a position in the time interval $\Delta t2$ between the two zero cross points P01, P03 so that the number of rotations of the ball is determined to be $1/\Delta t2$ (rotations) per unit time.

Furthermore, when P01 and P04 are used as the time-sequential zero cross points, two cycles of the difference waveform Lb takes a position in the time interval $\Delta t3$ between the two zero cross points P01, P04 so that the number of rotations of the ball is determined to be $2/\Delta t3$ (rotations) per unit time.

As described above, the ball rotation amount measurement system 1 can calculate the rotation speed of the ball, based on the time interval between time-sequential zero cross points P0.

Note that, by use of such a calculation method, the rotation speed of a ball can be easily acquired over the entire period in midair movement of the ball. Specifically, in the interval from the point immediately after a pitcher releases a ball to the point when a catcher catches the ball, the rotation speed of the ball fluctuates (is attenuated) to some extent. In order to detect the fluctuation of the rotation speed of the ball, such a rotation speed calculation method as described above is useful. Detection of the fluctuation of the rotation speed of the ball is made possible in such a way, and it can help in advanced analysis related to a pitching technique such as a pitching form, a ball gripping way, and so on.

Further, in order to significantly obtain the change in the rotation speed of a ball moving in midair by a calculation method shown in the present embodiment, use of a highly accurate magnetic sensor typified by a MI sensor is useful. This is because such a magnetic sensor is capable of accurately measuring geomagnetism at an interval as short as a few milliseconds or shorter.

In addition, operational effects identical to those of Embodiment 1 are achieved.

Embodiment 6

The present embodiment shows a variation of a method for calculating difference data in the difference data calculation unit 31.

Specifically, the difference between two time-sequential geomagnetic data only needs to be calculated as difference data, and thus, the two time-sequential geomagnetic data can be selected in various ways.

Figure 12:
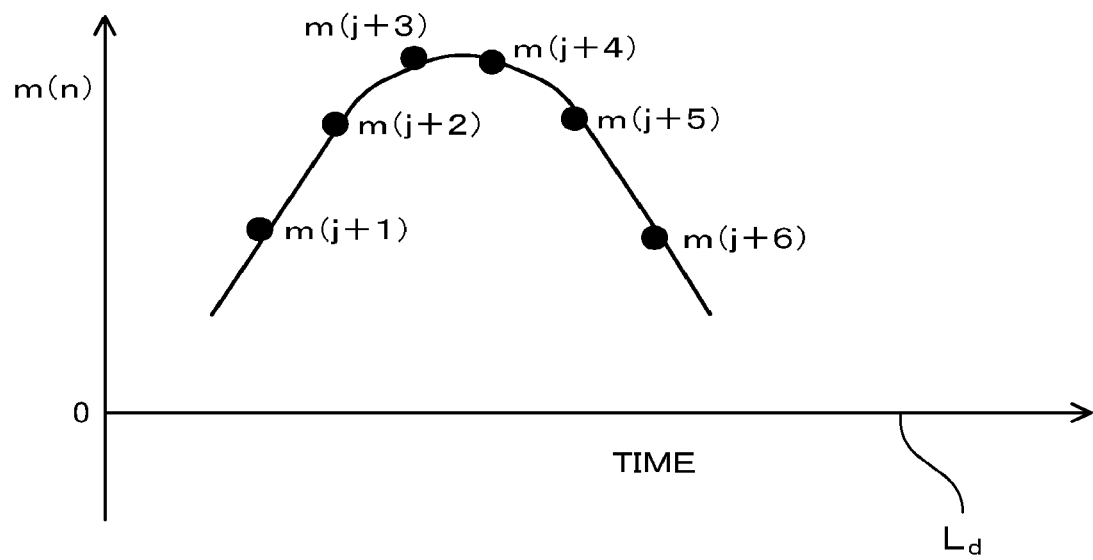
FIG. 12 is a diagram showing part of geomagnetic data according to Embodiment 6.

For example when a large number of time-sequential geomagnetic data, " . . . , m(j+1) m(j+6), . . . " are successively acquired as shown in FIG. 12, it is conceivable to calculate difference data, " . . . , $\Delta m(i+1)$ $\Delta m(i+5)$, . . . " as shown in the following calculation methods 1 to 4. Note that i and j each represents 0 or an arbitrary natural number. Geomagnetic data are to be acquired at equal intervals.

. . . ,$\Delta m(i+1)=m(j+2)-m(j+1),\Delta m(i+2)=m(j+3)-m(j+2),\Delta m(i+3)=m(j+4)-m(j+3),\Delta m(i+4)=m(j+5)-m(j+4),\Delta m(i+5)=m(j+6)-m(j+5)$,   [Calculation method 1]:

. . . ,$\Delta m(i+l)=m(j+3)-m(j+1),\Delta m(i+2)=m(j+5)-m(j+3)$,   [Calculation method 2]:

. . . ,$\Delta m(i+1)=m(j+3)-m(j+1),\Delta m(i+2)=m(j+4)-m(j+2),\Delta m(i+3)=m(j+5)-m(j+3),\Delta m(i+4)=m(j+6)-m(j+4)$,   [Calculation method 3]:

. . . ,$\Delta m(i+1)=m(j+4)-m(j+1),\Delta m(i+2)=m(j+5)-m(j+2),\Delta m(i+3)=m(j+6)-m(j+3)$,   [Calculation method 4]:

For example, when the acquisition time interval of geomagnetic data is set to 2 milliseconds, the difference data derived from [Calculation method 1] is equivalent to the change amount of geomagnetism vectors obtained at a time interval of 2 milliseconds, whereas the difference data derived from [Calculation method 2] and [Calculation method 3] is equivalent to the change amount of geomagnetism vectors at a time interval of 4 milliseconds. Furthermore, the difference data derived from [Calculation method 4] is equivalent to the change amount of geomagnetism vectors obtained at a time interval of 6 milliseconds.

Note that, in [Calculation method 2], when geomagnetic data is actually acquired per 2 milliseconds, the data per 4 milliseconds are used for calculation of difference data, thus, the acquired geomagnetic data are used by half. Besides, in [Calculation method 3] and [Calculation method 4], almost all of the geomagnetic data actually acquired are used. Accordingly, the precise difference waveform Lb can be obtained with obtaining an appropriate size of difference data.

Figure 13:
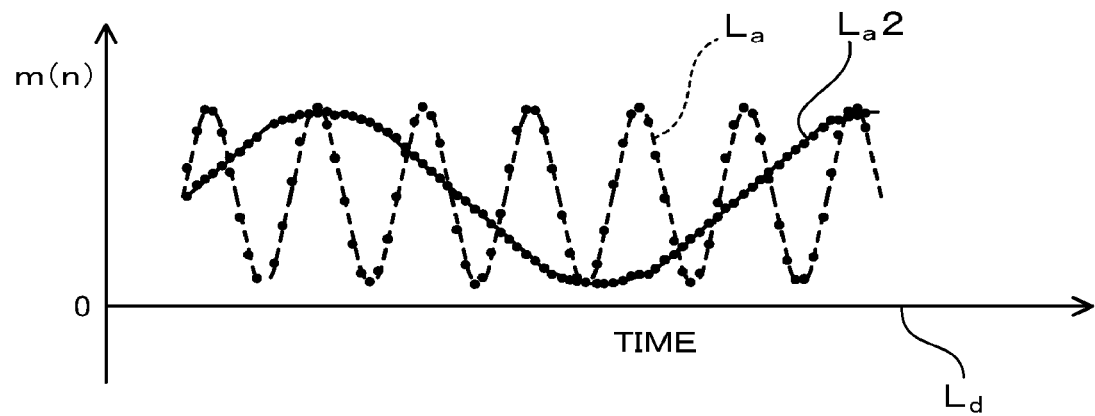
FIG. 13 is a diagram showing two types of geomagnetic data on different rotational speeds according to Embodiment 6.
Figure 14:
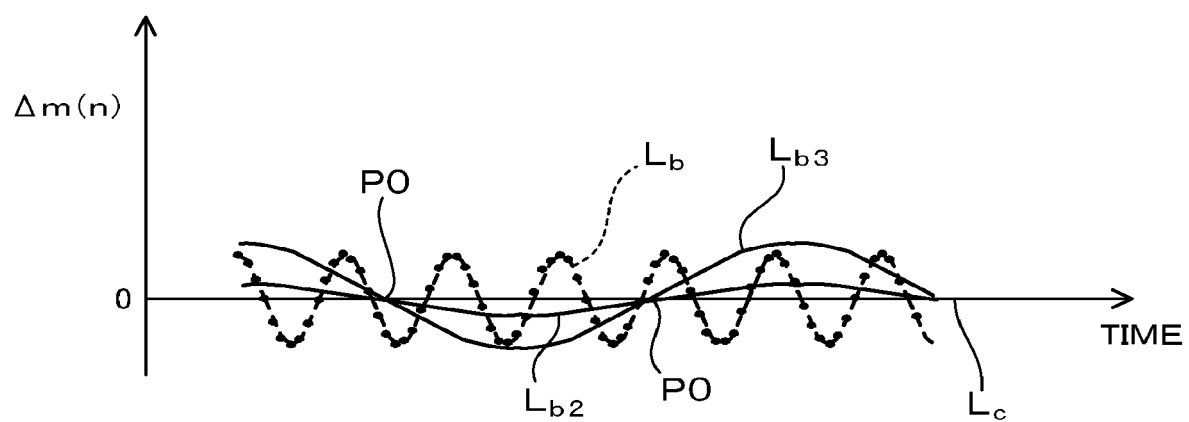
FIG. 14 is a diagram showing three types of difference waveforms according to Embodiment 6.

For example, when the rotation amount of a ball is relatively small, each difference data are likely to be small in the value. Specifically, when the rotation amount of a ball is small, the frequency of geomagnetic data m(n) is low, as indicated by a curved line La2 in FIG. 13. Therefore, when using the same difference data calculation method, (for example, in the case of using [Calculation method 1] in common), a value of difference data is smaller in the case where a rotation amount of a ball is small (curved line La2 in FIG. 13), as compared with the case where a rotation amount of a ball is large (curved line La in FIG. 13). Thus, when the rotation amount of a ball is small, the difference waveform is excessively small as indicated by Lb2 in FIG. 14, so that zero cross points P0 may become difficult to accurately acquire.

Therefore, in such a case, the value of difference data can be made large by calculating the difference between two geomagnetic data at a relatively long time interval as difference data as in [Calculation method 2] to [Calculation method 4]. As a result, the amplitude of the difference waveform is made sufficiently large, as indicated by a curved line Lb3 in FIG. 14, such that zero cross points P0 can be easily calculated with accuracy.

In contrast, when measuring the rotation amount of a ball rotating at high speed, there is concern that the accuracy may be deteriorated if the time interval between two geomagnetic data for use in calculation of difference data is excessively broadened.

It is desirable to extract geomagnetic data in an appropriate way to use in calculation of difference data, in consideration of such concern.

Note that the calculation method for difference data is not limited to the aforementioned [Calculation method 1] to [Calculation method 4], and other various calculation methods are conceivable.

Besides, the same configurations are provided, so that the same operational effects as in Embodiment 1 are achieved.

The present invention is not limited to the aforementioned embodiments, and is applicable to various embodiments within the scope of the gist of the present invention. For example, the aforementioned embodiments may be combined with each other as appropriate. For example, Embodiment 2 and Embodiment 3 may be combined to constitute another embodiment. In addition, the starting time point and the ending time point of midair movement of a ball can be acquired not only by the method using an acceleration sensor as described in Embodiment 2, but also by other methods.

Note that because the rotation amount of a ball moving in midair can be measured accurately as described above, the measurement is useful, for example, in the case where baseball pitching is targeted to be measured for the following viewpoints. Specifically, it is conceivable to use the measurement for checking the relation of the rotation amount of a pitched ball and the quality of the pitched ball, and for evaluating the quality of the pitched ball on the basis of the rotation amount of the ball. For a straight pitch, it is as people say that the higher the rotation speed is, the ball flies in a more straight manner, the relation of which can be quantitatively checked, and the quality of the straight pitch can be evaluated on the basis of the rotation speed. In addition, for a breaking pitch such as a curve ball or a screwball, it enables to check the relation of the rotation amount of the ball and the way of course change, and to evaluate that. As in Embodiment 3 mentioned above, the quality of pitches such as a knuckleball or a forkball can also be evaluated by measurement of the rotation amount (rotation angle) of these balls with low rotations.

Furthermore, in particular, use of an MI sensor as the magnetic sensor enables more advanced analysis of pitching. This is not only because the MI sensor itself has high sensitivity and high accuracy (that is, the MI sensor is capable of measuring geomagnetism at a very short time interval with accuracy), but also because the MI sensor is compact and light. In fact, in the present system, the magnetic sensor needs to be incorporated in a ball, and then, it is important to incorporate the magnetic sensor in such a manner so as not to affect a subtle touch, mass distribution, or the like as well as the weight of the ball. This is because there is a risk that the ball for the ball rotation amount measurement system, which has a different touch, etc. compared with a ball (e.g., an official ball, etc.) for use in an actual game, and so on may degrade the utility value of the ball. Also from this viewpoint, use of an MI sensor as the magnetic sensor enables the achievement of a more useful ball rotation amount measurement system.

Moreover, in the aforementioned embodiments, the aspects for measuring the rotation amount of a ball pitched by a baseball pitcher have been described. However, application of the ball rotation amount measurement system according to the present invention is not limited these aspects. The rotation amount of a ball in serving or strokes in tennis may be targeted to be measured, for example. In addition, the ball rotation amount measurement system can be applied not only to baseball and tennis, but also to other ball games such as softball, golf, table tennis, volleyball, and football.

The invention claimed is:

1. A ball rotation amount measurement system for measuring a rotation amount of a ball moving in midair, the system comprising:
    a magnetic sensor fixed to the ball to measure geomagnetism in at least one axial direction; and
    a computation unit configured to compute the rotation amount of the ball by using data of a large number of the geomagnetism that are time-sequentially acquired by the magnetic sensor, wherein
    the computation unit includes:
        a difference data calculation unit configured to calculate a difference between two of the time-sequential geomagnetic data to thereby time-sequentially obtain a large number of difference data;
        a difference waveform calculation unit configured to determine a difference waveform that represents a time variation waveform of a large number of the difference data; and
        a rotation amount calculation unit configured to calculate the rotation amount of the ball, based on information of zero cross points at which the difference waveform crosses a straight line indicating zero-difference.

2. The ball rotation amount measurement system according to claim 1, wherein the difference data calculation unit is configured to calculate, as the difference data, the difference between two of the time-sequential geomagnetic data adjacent to each other to thereby time-sequentially obtain a large number of the difference data.

3. The ball rotation amount measurement system according to claim 1, Wherein the rotation amount calculation unit is configured to calculate the rotation amount of the ball, based on a crossing number that is the number of crossing between the difference waveform and the straight line indicating zero-difference within a predetermined interval.

4. The ball rotation amount measurement system according to claim 3, wherein the rotation amount calculation unit is configured to calculate a rotation speed of the ball, based on the crossing number per unit time.

5. The ball rotation amount measurement system according to claim 1, wherein
    the rotation amount calculation unit is configured to calculate a rotation speed of the ball, based on a time interval between the time-sequential zero cross points.

6. The ball rotation amount measurement system according to claim 1, Wherein the magnetic sensor is configured to measure the geomagnetism in a plurality of axial directions that are different from one another, and the difference data calculation unit is configured to calculate the difference data by using geomagnetic data having a largest amplitude among the geomagnetic data obtained in the plurality of axial directions.

7. The ball rotation amount measurement system according to claim 6, wherein the magnetic sensor is configured to measure the geomagnetism in three axial directions that are orthogonal to one another.

8. The ball rotation amount measurement system according to claim 7, wherein
    the computation unit further includes a vector calculation unit configured to calculate a geomagnetism vector, based on the geomagnetic data obtained in the three axial directions by the magnetic sensor, and an orientation change amount calculation unit configured to determine an orientation change amount of the ball during an interval between a starting time point and an ending time point of midair movement of the ball, and
    the orientation change amount calculation unit is configured to calculate the orientation change amount of the ball, based on a starting vector that s the geomagnetism vector obtained by the vector calculation unit at the starting time point, and an ending vector that is the geomagnetism vector obtained by the vector calculation unit at the ending time point.

9. The ball rotation amount measurement system according to claim 7, wherein
    the computation unit further includes a vector calculation unit configured to calculate a geomagnetism vector, based on the geomagnetic data obtained in the three axial directions by the magnetic sensor, and an in-movement orientation change amount calculation unit configured to determine an orientation change amount of the ball during an interval between a first time point and a second time point of midair movement of the ball, and
    the in-movement orientation change amount calculation unit is configured to calculate the orientation change amount of the ball, based on a first time point vector that is the geomagnetism vector obtained by the vector calculation unit at the first time point, and a second time point vector that is the geomagnetism vector obtained by the vector calculation unit at the second time point.

10. The ball rotation amount measurement system according to claim 1, further comprising:
    an acceleration sensor fixed to the ball to measure acceleration in at least one axial direction; and
    a start detection unit and an end detection unit configured to detect the starting time point and the ending time point of the midair movement of the ball; respectively, based on acceleration data acquired by the acceleration sensor.

11. The ball rotation amount measurement system according to claim 10, wherein the acceleration sensor is configured to measure the acceleration in a plurality of axial directions that are different one another.

12. The ball rotation amount measurement system according to claim 11, wherein
    the acceleration sensor is configured to measure the acceleration in three axial directions that are orthogonal to one another.

13. The ball rotation amount measurement system according to claim 11, wherein the magnetic sensor is constituted by a magneto-impedance sensor.

* * * * *